United States Patent Office 3,045,033
Patented July 17, 1962

3,045,033
WATER SOLUBLE CYCLOPHOSPHATE ESTERS OF STEROIDS AND PROCESS FOR PREPARING SAME
David H. Gould, Leonia, and Elliot Shapiro, Cedar Grove, N.J., assignors to Schering Corporation, Bloomfield, N.J., a corporation of New Jersey
No Drawing. Filed May 10, 1961, Ser. No. 109,003
22 Claims. (Cl. 260—397.45)

Our invention relates to a novel process for the manufacture of soluble esters of hormones and to intermediates obtained thereby. More particularly, our invention relates to a method for preparing water-soluble esters of valuable adrenocortical hormonal substances which are useful in treating conditions associated with adrenocortical insufficiency.

This application is a continuation-in-part of our previously filed applications, Serial No. 624,755, filed November 28, 1956, now abandoned, and Serial No. 700,993, filed December 6, 1957, now abandoned.

For many years, researchers have attempted to prepare water-soluble and water-stable esters of adrenocortical hormones such as are represented by cortisone and hydrocortisone. With the development of the more potent corticoids, prednisone and prednisolone, the search has been continuing to the present date. Esters of cortisone and hydrocortisone with dibasic acids such as succinic acid, have partially solved the problem. By preparing a half acid ester, for example, hemisuccinate, and forming a sodium salt of the free carboxyl group, a water-soluble ester is obtained. Salts of esters, such as hemisuccinates and the like, do not fulfill the major requirement, stability in aqueous solution. It has been found and is generally known that salts of esters, such as sodium hydrocortisone 21-hemisuccinate, decompose in solution, and these salts must be used shortly after dissolving in water. The instability of this ester salt may be due to its own alkalinity, which promotes saponification.

It has been found that esterifying corticoids such as cortisone, hydrocortisone, prednisone and prednisolone at the C-17 carbinol and C-21 carbinol to form the cyclophosphate ester, provides intermediate compounds which have both water-solubility and stability, particularly in the form of their corresponding mono-sodium salts and which while having valuable adrenocortical activity per se are also readily converted to the corresponding dihydrogen phosphate esters. The sodium salts of such esters are relatively neutral in aqueous solution and there is little or no hydrolysis.

These soluble salts of dihydrogen phosphate esters are useful when intravenous administration is indicated such as in conditions arising from shock. The dihydrogen phosphate ester salts are, in addition, especially applicable for incorporation in ophthalmic and nasal preparations. Heretofore a major objection to the insoluble salts of these esters has been that these corticoids are, of necessity, employed in suspension and these suspensions are inefficiently absorbed and, in addition, create a gritty sensation when applied to the eye or nasal mucosa of the patient. With the advent of these soluble esters, however, homogeneous solutions free from suspended particles have been made possible, permitting more efficient absorption of the adrenocortical substance. These dihydrogen phosphate ester salts are also useful in creams, ointments and lotions for essentially the same indications as the free hormones as well as other indications which are preferably treated with solutions of the corticoid, i.e., intravenously or intra-articularly.

The soluble dihydrogen phosphate ester salts of the cortical steroids have been prepared by a number of methods all of which, however, have serious deficiencies. Procedures such as reacting a C-21 iodide with silver dihydrogen phosphate, results in partial esterification and partial formation of the insoluble 17,21-epoxide. Attempts have also been made to prepare dihydrogen phosphate esters by reaction of the free 21-alcohol with phosphorus pentoxide or phosphorus oxychloride. Invariably polyphosphates are obtained as well as esterification of other free hydroxyl groups such as at C-11 or C-17. A common method for preparing dihydrogen phosphate esters, in the sugar and nucleotide field, is to react the hydroxylic compound with diphenylchlorophosphonate or dibenzylchlorophosphonate and generate the dihydrogen phosphate moiety by catalytic reduction. Such a procedure is applicable only in the absence of reducible groups such as carbonyl or carbon-carbon double bonds. It is obvious that such a procedure is not applicable to the corticoids which have a plurality of reducible groups.

We have now found that o-hydroxyphenyl-17,21-cyclophosphate esters of therapeutically active corticosteroids can be easily prepared in good yield. We have also discovered that these intermediate hydroxy substituted cyclophosphate esters can be converted to the corresponding 17,21-monohydrogen cyclophosphate esters in good yield by treatment with mild alkali and are convertible to the corresponding dihydrogen phosphate esters by subsequent treatment with dilute acidic materials.

Our new esters are prepared according to the following equation, where I denotes a 17,21-dihydroxy steroid of the cortical group, with only the D-ring being shown:

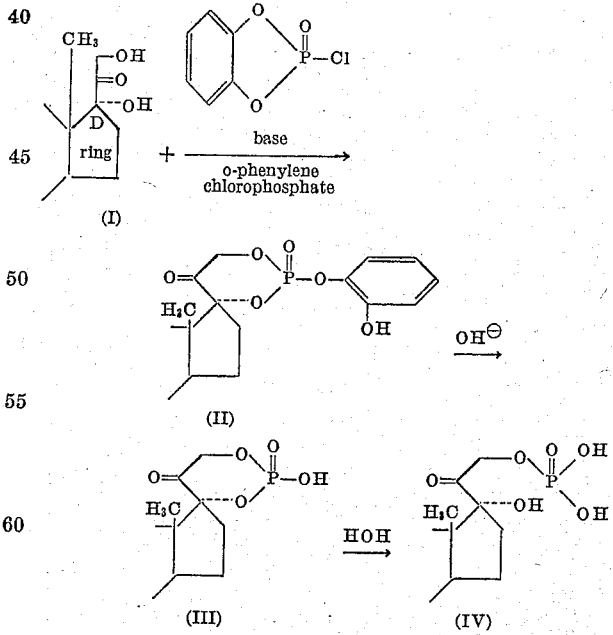

In this sequence the sterol (I) is reacted with o-phenylene chlorophosphate in the presence of a suitable base, i.e., an organic tertiary amine or inorganic alkali in a polar non-hydroxylic medium, such as, for example, pyridine, or sodium carbonate in a solvent such as, dimethylformamide, to cause the formation of the o-hydroxyphenyl-17,21-cyclophosphate derivative (II); saponification employing a standard hydroxylic inorganic alkali in a stepwise manner results in the formation of the monohydrogen derivative thereof (as indicated by structural Formula III above). Mild hydrolysis of this monohydrogen derivative results in the production of the dihydrogen phosphate ester (see structural Formula IV above).

This hydrolysis is acid-catalyzed and therefore occurs more rapidly in aqueous acetic acid, dilute hydrochloric acid, dilute sulfuric acid and the like. Alcohols, especially methanol, also carry out this hydrolysis more rapidly and the solution is preferably neutralized where alcohol is employed after about ½ hour of boiling. Aqueous solutions of strong inorganic bases e.g. sodium hydroxide, potassium hydroxide, also slowly hydrolyze the cyclophosphate and should be neutralized after a like period.

While not narrowly critical, the base selected to effect the preparation of the initial cyclophosphate described above (II) is a non-hydroxylic polar base and normally an organic tertiary base such as, for example, pyridine, lutidine, collidine, triethylamine or an inorganic alkali dissolved in a polar non-hydroxylic solvent. Examples of these latter basic materals are, for example, sodium carbonate, sodium hydroxide, potassium carbonate, potassium hydroxide, calcium carbonate, calcium hydroxide and the like. Illustrative of suitable non-hydroxylic polar solvents are dimethylformamide, dimethylsulfoxide, diethyl acetamide and the like. This initial reaction is most desirably carried on at temperatures in the range of 0° C. to −150° C.

While we do not wish to be limited to any particular theory, it would appear that prior to the formation of the cyclophosphate (II), in the general reaction described above, an intermediate ester of the general formula

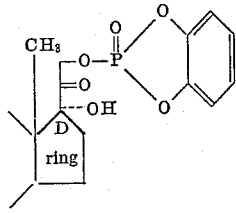

I(a)

wherein only the D-ring is shown, is effected. This latter compound is converted to the above identified o-hydroxyphenyl cyclophosphate (II), the base present being responsible apparently for the molecular rearrangement to the cyclic product. It is noted further that in the absence of a substantially non-hydroxylic, polar alkaline material such as described above, e.g., pyridine, the phosphate ester I(a), may be prepared by the addition of benzene, or dioxane with a solid base such as CaCO₃, to remove the acid formed. Subsequent hydrolysis results in the formation of the corresponding dihydrogen phosphate (IV).

Although the preferred compounds of our invention are the 17,21-o-hydroxyphenyl cyclophosphates of prednisone, prednisolone, cortisone and hydrocortisone as well as the 9α-fluoro analogues thereof, our process is not limited solely to the esterification of these corticoids. On the contrary, it provides a method by which cyclophosphate esters of all therapeutically active 17,21-dihydroxy-corticosteroids can be prepared. The presence of non-functional groups or of other functional groups in the molecule such as keto or sterically hindered hydroxyl groups, e.g., the beta-hydroxyl group positioned at the 11-carbon position, does not affect the operability of our process; thus our procedure is generally applicable to those therapeutically useful steroids which possess free 17α-hydroxyl and 21-hydroxyl groups and which otherwise do not contain free acylable hydroxyl groups in the steroid nucleus. Thus, by way of further illustration, the therapeutically active dihydroxy corticosteroids which may be employed herein may include compounds of the formula:

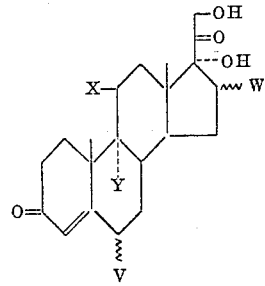

wherein V represents hydrogen, halogen, or a lower alkyl substituent, W is hydrogen, hydroxyl or a lower alkyl radical, X is a keto or hydroxy radical (i.e., H, βOH) and Y is hydrogen or a halogen substituent; as well as the Δ¹,⁴ and Δ¹,⁴,⁶ analogues thereof.

Specific examples of these corticoids are the 9α-fluoro analogs of prednisone, prednisolone, cortisone, hydrocortisone, corticosterone or desoxycorticosterone as well as, for example, 6α-methyl-prednisolone, 6α-fluoro-prednisolone, 6α-methyl-9α-fluoro-prednisolone, 6α-fluoro-16α-methyl-prednisolone, 9α-fluoro-16β-methyl-prednisolone, 9α-fluoro-16α-methyl-prednisolone, 16β-methyl-prednisolone, 16α-acetoxy-9α-fluoro-prednisolone, 16α-acetoxy-cortisone, 6α-methyl-9α-fluoro-hydrocortisone, 6α-methyl-9α - fluoro - 1,4,6 - pregnatriene - 17α,21 - dione - 3,11,20-trione and the like.

The basic requirements for applicability and operability of our process, therefore, is that the free sterol be therapeutically active and contain 17α,21-hydroxyl groups. The presence of non-functional groups or of other functional groups in the molecule such as keto or sterically hindered hydroxyl groups e.g., the beta-hydroxy radical positioned at the 11-carbon, does not affect the operability of our process; thus our method may be generally applied to all therapeutically acceptable 21-carbon steroids which possess free 17α-hydroxyl and 21-hydroxyl groups and which otherwise do not contain free acylable hydroxyl groups in the steroid nucleus.

The following examples are further illustrative of our invention:

EXAMPLE 1

*Prednisolone-o-Hydroxyphenyl-17,21-Cyclophosphate*

Prednisolone (4.6 g.) is dissolved in 30 ml. of dry pyridine and chilled to −80° C. in a Dry-Ice-acetone bath. There is added 2.8 g. of o-phenylene chlorophosphate (M.P. 57–60° C.) and the mixture is allowed to stand at −80° C. for 1.5 hours. The mixture is then stirred at −20° C. for 18 hours, poured into ice and water, acidified and extracted three times with methylene chloride. The methylene chloride solution is washed with water until neutral and concentrated. The residue is recrystallized from acetone-hexane yielding the ester, prednisolone-o-hydroxyphenyl-17,21-cyclophosphate having a melting point (M.P.) of 177–180° (dec.).

Following the same procedure using an equivalent quantity of hydrocortisone, hydrocortisone-o-hydroxyphenyl-17,21-cyclophosphate which is purified by recrystallization from acetone-hexane is obtained.

EXAMPLE 2

*Prednisone-o-Hydroxyphenyl-17,21-Cyclophosphate*

To a solution of 5.0 g. of prednisone in 40 ml. of anhydrous lutidine previously chilled to −80° C., is added 3.0 g. of o-phenylenechlorophosphate. The mixture is stirred at −25° C. for 16–20 hours and then poured into ice and water. After acidification with dilute hydrochloric acid the mixture is extracted with chloroform. The chloroform solution is washed with water and then concentrated to a residue, the residue is recrystallized from acetone-hexane yielding the ester of this example.

In a similar manner, by substituting cortisone in the foregoing procedure, there is obtained cortisone-o-hydroxyphenyl-17,21-cyclophosphate.

EXAMPLE 3

*Conversion of Prednisolone-o-Hydroxyphenyl-17,21-Cyclophosphate to Prednisolone 17,21-Monohydrogen Cyclophosphate*

Prednisolone - o - hydroxyphenyl - 17,21 - cyclophosphate (514 mg.) is treated with a solution of 212 mg. of sodium carbonate in 15 ml. of water. The mixture is warmed for one minute to dissolve the ester and cooled rapidly. The chilled solution is made slightly acid with hydrochloric acid and the precipitate of prednisolone mono-hydrogen 17,21-cyclophosphate is removed by filtration. The mono-hydrogen cyclophosphate is purified by crystallization from ethyl acetate-hexane, M.P. 188–189° C. (dec.). The mono-sodium salt of the monohydrogen phosphate ester is prepared in situ as follows:

The ester is added to a buffer solution of sodium dihydrogen phosphate and disodium hydrogen phosphate whose pH is between 6.5 and 7.5. The quantities of solute and buffer solution are determined by the desired final concentration.

EXAMPLE 4

*Conversion of Prednisone-o-Hydroxyphenyl-17,21-Cyclophosphate to Prednisone 17,21-Monohydrogen Cyclophosphate*

To a solution of 80 mg. of sodium hydroxide in 15 ml. of water is added 500 ml. of prednisone-o-hydroxyphenyl-17,21-cyclophosphate. The mixture is warmed until the ester dissolves and the solution is then rapidly cooled. The chilled solution is acidified with dilute sulfuric acid and the precipitate consisting of prednisone-17,21-monohydrogen-cyclophosphate is removed by filtration. The cyclophosphate is crystallized from acetone-hexane.

The sodium salt of prednisone 17,21-cyclophosphate is prepared in situ according to the analogous procedure described in Example 3.

EXAMPLE 5

*Formation of Prednisolone Dihydrogen Phosphate*

A sample of 1 g. of prednisolone 17,21-cyclophosphate is suspended in 100 ml. of water and the mixture is boiled under nitrogen for 40 hours. During this period the solid goes into solution. The solution is then titrated with 0.1 N sodium hydroxide to obtain the disodium salt of the desired product, prednisolone, and dihydrogen phosphate. The titration curve measured potentiometrically shows the typical double break of the dihydrogen phosphate mono steroid ester in contrast to the single break in the curve for the cyclophosphate.

EXAMPLE 6

*Preparation of 21-o-Phenylene Phosphate of Prednisolone and Conversion to 21-Phosphate*

Ten grams of prednisolone is dissolved in 400 ml. of dioxane and 2 g. of calcium carbonate powder is added. The mixture is stirred and chilled in a Dry Ice-acetone bath while 5.8 g. of catechol phosphoryl chloride is added. The mixture is then stirred at room temperature for 17 hours and filtered. The solution contains the desired intermediate, 21-o-phenylene phosphate of prednisolone. The solution is heated on the steam bath for 15 minutes with an aqueous solution of 1 equivalent of sodium bicarbonate and is then evaporated to dryness in vacuo. The residue is dissolved in 500 ml. of water, giving a solution containing 12.2 g. of prednisolone dihydrogen phosphate in the form of the mono sodium salt. Paper chromatography and biological testing showed this to be the corresponding 21-dihydrogen phosphate.

EXAMPLE 7

*9α-Fluoro-16α-methyl-1,4-Pregnadiene-3,20-Dione-11β, 17α,21-Triol-o-Hydroxyphenyl-17,21-Cyclophosphate*

9α - Fluoro - 16α - methyl - 1,4-pregnadiene-3,20-dione-11β,17α,21-triol (5.1 g.) is dissolved in 30 ml. of dry pyridine and chilled to —80° C. in a Dry-Ice-acetone bath. There is added 2.8 g. of o-phenylene chlorophosphate (M.P. 57–60° C.) and the mixture is allowed to stand at —80° C. for 1.5 hours. The mixture is then stirred at —20° C. for 18 hours, poured into ice and water, acidified and extracted three times with methylene chloride. The methylene chloride solution is washed with water until neutral and concentrated. The residue is recrystallized from acetone-hexane yielding the ester 9α-fluoro-16α-methyl-1,4-pregnadiene-3,20-dione-11β,17α,21-triol-o-hydroxyphenyl-17,21-cyclophosphate.

Following the same procedure using an equivalent quantity of 9α-fluoro-16β-methyl-1,4-pregnadiene-3,20-dione-11β,17α,21-triol; 6α-fluoro-16α-methyl-1,4-pregnadiene-3,20-dione-11β,17α,21-triol; 6α-methylprednisolone and 6α-fluoroprednisolone, there is produced, respectively, 9α-fluoro-16β-methyl-1,4-pregnadiene-3,20-dione-11β-17α-21-triol-o-hydroxyphenyl-17,21-cyclophosphate; 6α-fluoro-16α-methyl-1,4-pregnadiene-3,20-dione-11β-17α,21-triol-o-hydroxyphenyl-17,21-cyclophosphate; 6α-methylprednisolone-o-hydroxyphenyl-17,21-cyclophosphate and 6α-fluoroprednisolone-o-hydroxyphenyl-17,21-cyclophosphate.

EXAMPLE 8

*Conversion of 9α - Fluoro - 16α-Methyl-1,4-Pregnadiene-3,20 - Dione-11β,17α,21-Triol-o-Hydroxyphenyl-17,21-Cyclophosphate to 9α-Fluoro-16α-Methyl-1,4-Pregnadiene - 3,20-Dione-11β,17α,21-Triol-17,21-Monohydrogen Cyclophosphate*

9α - Fluoro - 16α - methyl-1,4-pregnadiene-3,20-dione-11β,17α,21 - triol - o-hydroxyphenyl-17,21-cyclophosphate (510 mg.) is treated with a solution of 212 mg. of sodium carbonate in 15 ml. of water. The mixture is warmed for two minutes to dissolve the ester and cooled rapidly. The chilled solution is made slightly acid with hydrochloric acid and the precipitate of 9α-fluoro-16α-methyl-1,4 - pregnadiene-3,20-dione-11β,17α,21-triol-17,21-monohydrogen cyclophosphate is removed by filtration. The monohydrogen cyclophosphate is purified by crystallization from ethyl acetate-hexane. The mono-sodium salt of the monohydrogen ester is prepared in situ as follows:

The ester is added to a buffer solution of sodium dihydrogen phosphate and disodium hydrogen phosphate whose pH is between 6.5 and 7.5. The quantities of solute and buffer solution are determined by the final concentration.

Following the same procedure using an equivalent quantity of 9α-fluoro-16β-methyl-1,4-pregnadiene-3,20-dione - 11β,17α,21 - triol - o - hydroxyphenyl-17,21-cyclophosphate; and 6α-fluoro-16α-methyl-1,4-pregnadiene-3,20-dione-11β,17α,21-triol-o-hydroxyphenyl-17,21-cyclophosphate, the corresponding 17,21-monohydrogen cyclophosphates are formed.

Additionally, the corresponding monosodium salts of the monohydrogen phosphate esters are prepared in the manner hereinabove described.

EXAMPLE 9

*Conversion of 6α-Methylprednisolone-o-Hydroxyphenyl-17,21-Cyclophosphate to 6α-Methylprednisolone-17,21-Monohydrogen Cyclophosphate*

To a solution of 80 mg. of sodium hydroxide in 15 ml. of water is added 510 mg. of 6α-methylprednisolone-o-hydroxyphenyl-17,21-cyclophosphate. The mixture is warmed until the ester dissolves and the solution is then rapidly cooled. The chilled solution is acidified with dilute sulfuric acid and the precipitate consisting of 6α-methylprednisolone-17,21-monohydrogen cyclophosphate is removed by filtration. The cyclophosphate is crystallized from acetate-hexane.

The sodium salt of 6α-methylprednisolone-17,21-monohydrogen cyclophosphate is prepared in situ according to the analogous procedure described in Example 3. By following substantially the same procedure using an equivalent quantity of 6α-fluoroprednisolone-o-hydroxyphenyl-17,21-cyclophosphate, there is produced the corresponding 17,21-monohydrogen cyclophosphate. Similarly, its sodium salt is also produced in situ according to the analogous procedure described in Example 3.

We claim:
1. A compound of the group consisting of:

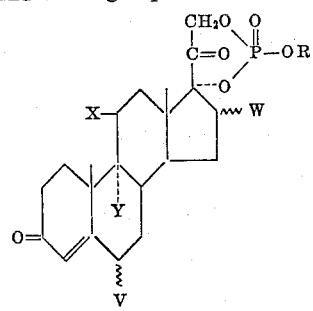

and the 1-dehydro analogues thereof wherein X is a member selected from the group consisting of O and (H, βOH); Y is a member selected from the group consisting of hydrogen and fluorine; V is a member selected from the group consisting of hydrogen, halogen and lower alkyl; W is a member of the group consisting of hydrogen, hydroxyl and lower alkyl; and R is a member of the group consisting of hydrogen and o-hydroxyphenyl.

2. 4 - pregnene - 17α,21-diol-3,11,20-trione-o-hydroxyphenyl-17α,21-cyclophosphate having the formula:

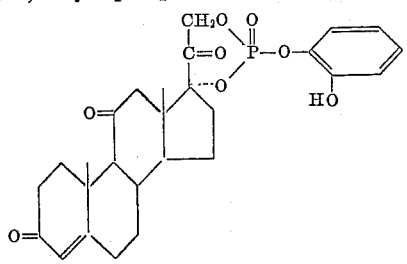

3. 1,4 - pregnadiene - 17α,21 - diol-3,11,20-trione-o-hydroxyphenyl-17α,21-cyclophosphate having the formula:

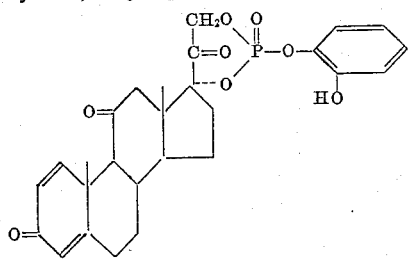

4. 4 - pregnene-11β,17α,21-triol-3,20-dione-o-hydroxyphenyl-17α,21-cyclophosphate having the formula:

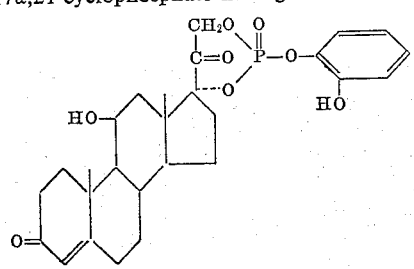

5. 1,4 - pregnadiene - 11β,17α,21-triol-3,20-dione-o-hydroxyphenyl-17α,21-cyclophosphate having the formula:

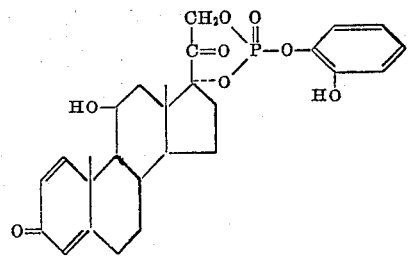

6. 9α - fluoro - 16α-methyl-1,4-pregnadiene-11β,17α,21-triol - 3,20-dione-o-hydroxyphenyl-17α,21-cyclophosphate having the formula:

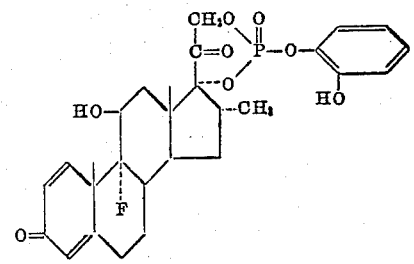

7. 9α - fluoro - 16β - methyl - 1,4 - pregnadiene - 11β, 17α,21 - triol - 3,20 - dione - o - hydroxyphenyl - 17α,21-cyclophosphate having the formula:

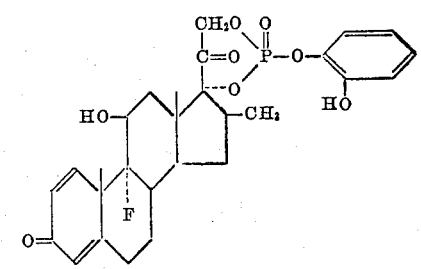

8. 6α - fluoro - 16α - methyl - 1,4 - pregnadiene - 11β, 17α,21 - triol - 3,20 - dione - o - hydroxyphenyl - 17α,21-cyclophosphate having the formula:

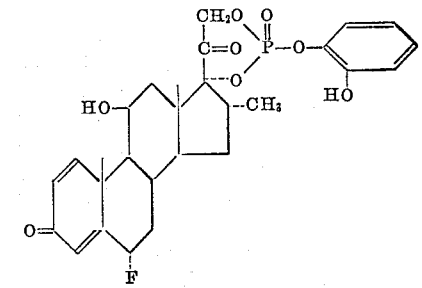

9. 6α - methyl - 1,4 - pregnadiene - 11β,17α,21 - triol - 3,20 - dione - o - hydroxyphenyl - 17α,21 - cyclophosphate having the formula:

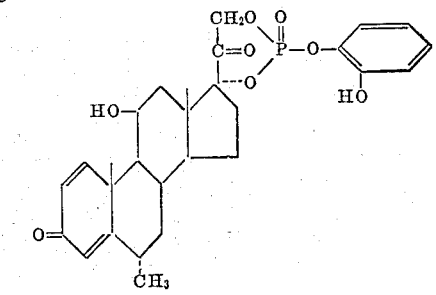

10. 6α - methyl - 1,4 - pregnadiene - 11β,17α,21 - triol - 3,20 - dione - o - hydroxyphenyl - 17α,21 - cylophosphate having the formula:

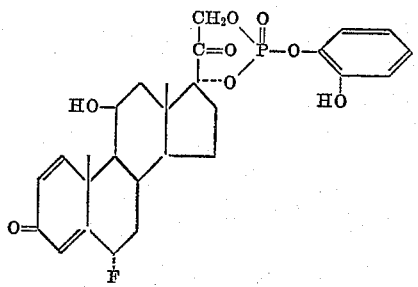

11. The process which comprises reacting a therapeutically active nuclearly unsaturated 3,20-diketo-17,21-dihydroxy-pregnane selected from the group consisting of a 3,20-diketo-17α,21-dihydroxy-4-pregnene and a 3,20-diketo-17α,21-dihydroxy-1,4-pregnadiene having at the 11-position a substituent selected from the group consisting of O and (H, βOH) with o-phenylenechlorophosphate in the presence of non-hydroxylic polar base at a temperature in the range of 0° C. to −150° C. to cause the formation of the corresponding o-hydroxyphenyl-17,21-cyclophosphate ester.

12. The process according to claim 11, wherein the reaction is carried out in pyridine.

13. The process for preparing phosphate esters of therapeutically active Δ⁴-3,20-diketo-17α,21-dihydroxy-pregnenes which comprises reacting a therapeutically active Δ⁴-3,20-diketo-17α,21-dihydroxy-pregnene having at the 11-position a substituent selected from the group consisting of O and (H, βOH) with o-phenylenechlorophosphate in the presence of a non-hydroxylic polar base, at a temperature in the range of 0° C. to −150° C.

14. The process of claim 13, wherein the pregnene is cortisone.

15. The process of claim 13, wherein the pregnene is hydrocortisone.

16. The process for preparing phosphate esters of therapeutically active Δ¹,⁴-3,20-diketo-17α,21-dihydroxypregnadiene which comprises reacting a therapeutically active Δ¹,⁴-3,20-diketo-17α,21-dihydroxypregnadiene having at the 11-position a substituent selected from the group consisting of O and (H, βOH) with a o-phenylenechlorophosphate in the presence of a non-hydroxylic polar base, at a temperature in the range of 0° C. to −150° C.

17. The process of claim 16, wherein the pregnadiene is prednisone.

18. The process of claim 16, wherein the pregnadiene is prednisolone.

19. 1,4 - pregnadiene - 11β,17α,21 - triol - 3,20 - dione 17α,21-monohydrogen cyclophosphate having the formula:

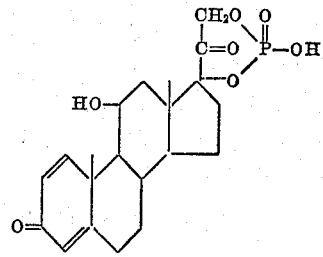

20. 1,4 - pregnadiene - 17α,21 - diol - 3,11,20 - trione 17α,21-monohydrogen cyclophosphate having the formula:

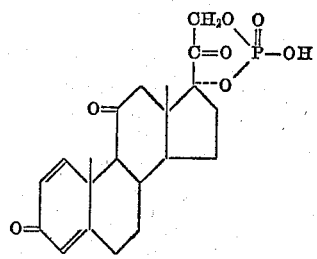

21. 9α - fluoro - 16α - methyl - 1,4 - pregnadiene - 11β,17α,21-triol-3,20-dione 17α,21-monohydrogen cyclophosphate having the formula:

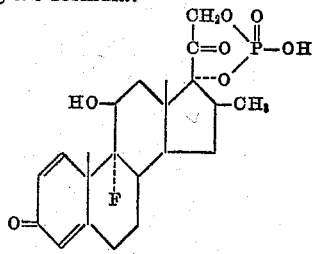

22. 6α - methyl - 1,4 - pregnadiene - 11β,17α,21 - triol - 3,20-dione 17α,21-monohydrogen cyclophosphate having the formula:

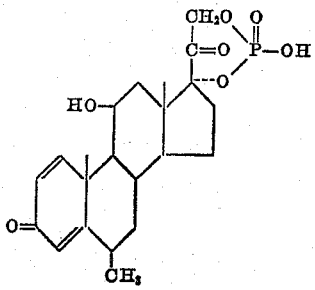

No references cited.